United States Patent
Bridel et al.

(10) Patent No.: US 11,502,285 B2
(45) Date of Patent: Nov. 15, 2022

(54) RECHARGEABLE ELECTROCHEMICAL CELL AND BATTERY

(71) Applicants: Umicore, Brussels (BE); Umicore Korea Ltd., Chungnam (KR)

(72) Inventors: Jean-Sébastien Bridel, Cheonan (KR); Stijn Put, Olmen (BE); Dongjoon Ihm, Cheonan (KR); Daniel Nelis, Peer (BE)

(73) Assignees: UMICORE, Brussels (BE); UMICORE KOREA LTD., Cheonan (KR)

( * ) Notice: Subject to any disclaimer, the term of this patent is extended or adjusted under 35 U.S.C. 154(b) by 324 days.

(21) Appl. No.: 16/332,421

(22) PCT Filed: Sep. 11, 2017

(86) PCT No.: PCT/EP2017/072702
§ 371 (c)(1),
(2) Date: Mar. 12, 2019

(87) PCT Pub. No.: WO2018/050585
PCT Pub. Date: Mar. 22, 2018

(65) Prior Publication Data
US 2021/0159481 A1 May 27, 2021

(30) Foreign Application Priority Data
Sep. 19, 2016 (EP) .................... 16189482

(51) Int. Cl.
| *H01M 4/131* | (2010.01) |
| *H01M 4/133* | (2010.01) |
| *H01M 4/134* | (2010.01) |
| *H01M 4/505* | (2010.01) |
| *H01M 4/525* | (2010.01) |
| *H01M 4/38* | (2006.01) |
| *H01M 10/0525* | (2010.01) |
| *H01M 4/02* | (2006.01) |

(52) U.S. Cl.
CPC ........... *H01M 4/131* (2013.01); *H01M 4/133* (2013.01); *H01M 4/134* (2013.01); *H01M 4/386* (2013.01); *H01M 4/505* (2013.01); *H01M 4/525* (2013.01); *H01M 10/0525* (2013.01); *H01M 2004/027* (2013.01); *H01M 2004/028* (2013.01)

(58) Field of Classification Search
CPC ...... H01M 4/131; H01M 4/133; H01M 4/134; H01M 4/525; H01M 4/386; H01M 4/505; H01M 10/0525; H01M 2004/027; H01M 2004/028
See application file for complete search history.

(56) References Cited

U.S. PATENT DOCUMENTS

| 8,865,348 B2 | 10/2014 | Sun et al. | |
| 2005/0136330 A1* | 6/2005 | Mao ........................ | H01M 4/13 |
| | | | 429/231.95 |
| 2006/0068287 A1* | 3/2006 | Morita .................. | H01M 4/366 |
| | | | 429/223 |
| 2007/0054191 A1 | 3/2007 | Shirane et al. | |
| 2010/0279172 A1* | 11/2010 | Hwang ................. | H01M 4/485 |
| | | | 429/219 |
| 2012/0064409 A1 | 3/2012 | Zhamu et al. | |
| 2013/0295433 A1* | 11/2013 | Chang ................... | H01M 4/583 |
| | | | 429/156 |
| 2014/0242455 A1* | 8/2014 | Ryu ..................... | H01M 4/0404 |
| | | | 429/188 |
| 2014/0315089 A1* | 10/2014 | Yu ......................... | H01M 4/366 |
| | | | 429/223 |
| 2016/0006021 A1 | 12/2016 | Lopez | |
| 2017/0040610 A1 | 2/2017 | Otsuka et al. | |
| 2017/0283265 A1* | 10/2017 | Cheng ................... | H01M 4/364 |
| 2017/0352877 A1 | 12/2017 | Put et al. | |
| 2018/0013132 A1 | 1/2018 | Chiba et al. | |
| 2018/0013169 A1 | 1/2018 | Kawasaki et al. | |

FOREIGN PATENT DOCUMENTS

| JP | 2007066834 A | 3/2007 |
| JP | 2010212228 A | 9/2010 |

(Continued)

OTHER PUBLICATIONS

S. Zhong, M. Lai, W. Yao, Z. Li. Synthesis and electrochemical properties of LiNi0.8CoxMn0.2-xO2 positive-electrode material for lithium-ion batteries, Electrochimica Acta 212 (2016) 343-351.*
N. Nitta, F. Wu, J. T. Lee, G. Yushin. Li-ion battery materials: present and future, Materials Today, vol. 18, No. 5, Jun. 2015.*
C. Chae , H.-J. Noh, J. K. Lee, B. Scrosati, Y.-K. Sun. A High-Energy Li-Ion Battery Using a Silicon-Based Anode and a Nano-Structured Layered Composite Cathode, Adv. Funct. Mater. 2014, 24, 3036-3042.*
D.-W. Jung, K.-H Kim, J. Lee, B.-S. Kong, E.-S. Oh. In Situ Synthesis and Cell Performance of a Si/C Core—Shell/Ball-Milled Graphite Composite for Lithium Ion Batteries, Journal of Nanoscience and Nanotechnology vol. 13, 7855-7859, 2013.*

(Continued)

*Primary Examiner* — Carlos Barcena
(74) *Attorney, Agent, or Firm* — NK Patent Law

(57) ABSTRACT

A rechargeable electrochemical cell comprising a negative electrode and a positive electrode is described. The positive electrode comprises a product having as overall formula $Li_p(Ni_xMn_yCo_zM_mAl_nA_a)O_{2\pm b}$, wherein M signifies one or more elements from the group Mg, Ti, Cr, V and Fe, wherein A signifies one or more elements from the group F, C, Cl, S, Zr, Ba, Y, Ca, B, Sn, Sb, Na and Zn, and wherein $0.9<(x+y+z+m+n+a)<1.1$, $b<0.02$, $0.9<p<1.110$, $0.30<x<0.95$, $(y+z) \geq 0.09$, $0 \leq m \leq 0.05$, $0 \leq a \leq 0.05$, and $0 \leq n \leq 0.15$. The negative electrode comprises composite particles, wherein the composite particles comprise silicon-based domains in a matrix material. The individual silicon-based domains are either free silicon-based domains that are not or not completely embedded in the matrix or are fully embedded silicon-based domains that are completely surrounded by the matrix material.

12 Claims, 1 Drawing Sheet

(56) References Cited

FOREIGN PATENT DOCUMENTS

| JP | 2012124122 | A | 6/2012 |
|----|------------|----|--------|
| TW | 201631825 | A | 9/2016 |
| WO | 2015159935 | A1 | 10/2015 |
| WO | 2016/102097 | A1 | 6/2016 |
| WO | 2016/102208 | A1 | 6/2016 |
| WO | 2016093246 | A1 | 6/2016 |
| WO | 2016136226 | A1 | 9/2016 |
| WO | 2016136226 | A1 | 12/2017 |

OTHER PUBLICATIONS

M. Pan, X. Liu, H. Liu, Y. Chen. Ultrafine Si/C—graphitecompositeanodematerialswithimproved cyclicperformance, Materials Letters 178 (2016) 252-255.*
ISA/EP; International Search Report and Written Opinion for International Application No. PCT/EP2017/072702 dated Dec. 19, 2017, 10 pages.
Kuksenko, S.P., "Silicon-containing anodes with high capacity loading for lithium-ion batteries", Russian Journal of Electrochemistry, vol. 50, No. 6, Jun. 1, 2014, pp. 537-547.
TIPO; Office Action for Taiwanese Patent Application No. 106131406 dated Jul. 28, 2020, 9 pages.
TIPO; Search Report for Taiwanese Patent Application No. 106131406 dated Jul. 27, 2020, 3 pages.
Kuksenko, S.P., "Silicon-Containing Anodes with High Capacity Loading for Lithium-Ion Batteries", Russian Journal of Electrochemistry, 2014, vol. 50, No. 6, pp. 537-545.
JPO; Office Action for Japanese Patent Application No. 2019-515344 dated May 31, 2021, 3 pages.

* cited by examiner

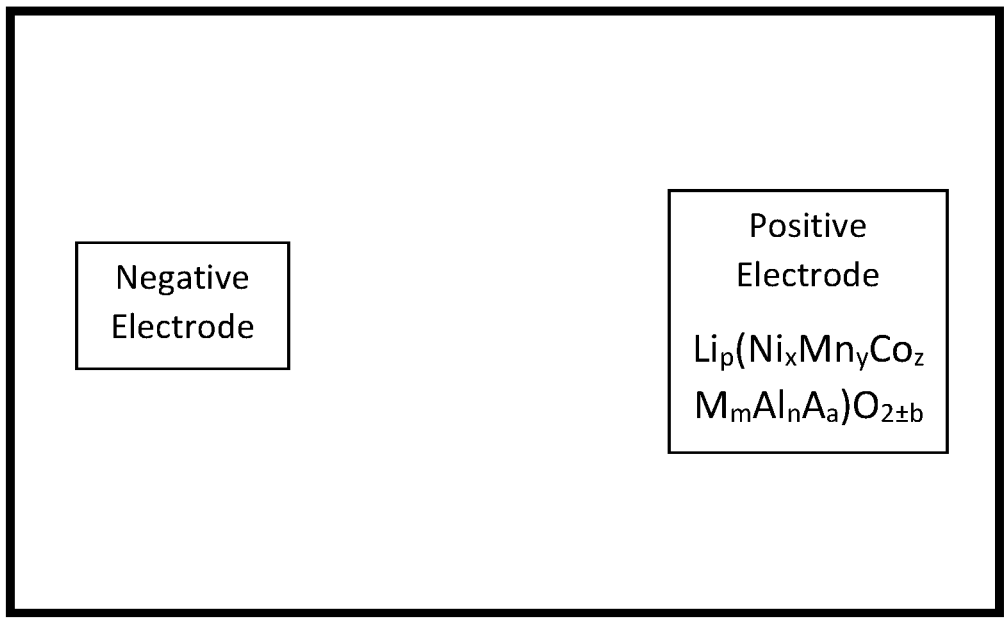

RECHARGEABLE ELECTROCHEMICAL CELL AND BATTERY

CROSS-REFERENCE TO RELATED APPLICATIONS

This application is a U.S. National Stage application of International Application No. PCT/EP2017/072702, filed on 11 Sep. 2017, which claims the benefit of European Patent Application No. 16189482.9, filed 19 Sep. 2016, the entire contents of which are all hereby incorporated herein by reference.

The present invention concerns a rechargeable electrochemical cell, in particular a lithium-ion electrochemical cell.

It is well known to make lithium-ion electrochemical cells having graphite as electrochemically active material at the negative electrode. A large number of options exist for the active material for the positive electrode.

Traditionally lithium cobalt oxide (LCO) is used, which has a very high energy density, but which is also relatively expensive and which is not suitable for high charging or discharging rates.

Alternatively, lithium nickel-manganese-cobalt oxides (NMC) can be used, having a lower cost and giving the possibility, by changing the Ni—Mn—Co ratio, of adapting the properties to the requirements, so of having high energy density or a high allowable discharge rate.

However, NMC has, with traditional negative electrode materials, a lower cycle life, meaning the number of charge-discharge cycles that the material may be subjected to, than LCO. Additionally, with increasing nickel content and correspondingly decreasing manganese and cobalt content, the cycle life of NMC materials further decreases. For commercial acceptability a cycle life performance of 80% capacity retention after 250 cycles is necessary.

Silicon based negative electrodes are far superior to graphite based negative electrodes as far as energy density is concerned. Pure silicon has in theory a capacity which is circa 10 times the capacity of graphite. In real-life batteries this leads to an improvement of between 5% and 30% in final energy density of the batteries, although further improvements are still possible. Silicon based negative electrodes are still inferior as far as cycle life is concerned, and/or, in the case of a material known as SiOx, also as far as the first cycle efficiency is concerned, but are beginning to be used commercially.

A problem with silicon based negative electrodes is the continuous formation of a SEI, a Solid-Electrolyte Interface on the negative electrode. A SEI is a complex reaction product of the electrolyte and lithium and can deposit on the negative electrode as a thick layer. It leads to a loss of lithium availability for electrochemical reactions and therefore to a poor cycling performance, which is the capacity loss per charging-discharging cycle. A thick SEI may further increase the electrical resistance of a battery and thereby limit the achievable charging and discharging rates. At every charging/discharging cycle the SEI partially breaks, exposing new active material, leading to the formation of fresh SEI.

Due to electrochemical effects taking place in both the positive electrode as well as in the negative electrode, the interaction between a given positive electrode material and a given negative electrode material is difficult to predict. Unexpected corrosion or depositing of compounds, both limiting the useful life of the electrochemical cell, can easily occur due the varying conditions during charging and discharging.

BRIEF DESCRIPTION OF THE DRAWING

The FIGURE is a schematic representation of an embodiment of the rechargeable electrochemical cell described herein.

A problem therefore exists in determining which positive electrode materials to combine with which silicon based negative electrode materials to obtain optimal electrochemical cell performance.

In order to reduce the abovementioned and other problems, the invention concerns a rechargeable electrochemical cell comprising a negative electrode and a positive electrode, whereby the positive electrode comprises as electrochemically active material, considered when the electrochemical cell is in a discharged state, a product having as overall formula

$$Li_p(Ni_xMn_yCo_zM_mAl_nA_a)O_{2\pm b},$$

whereby M signifies one or more elements from the group Mg, Ti, Cr, V and Fe, whereby A signifies one or more elements from the group F, C, Cl, S, Zr, Ba, Y, Ca, B, Sn, Sb, Na and Zn, whereby $0.9<(x+y+z+m+n+a)<1.1$,
whereby $b<0.02$
whereby $0.9<p<1.1$
whereby $0.30<x<0.95$
whereby $(y+z)\geq 0.09$
whereby $0\leq m\leq 0.05$
whereby $0\leq a\leq 0.05$,
whereby $0\leq n\leq 0.15$, whereby the negative electrode comprises, as electrochemically active material, composite particles, whereby the composite particles comprise silicon-based domains in a matrix material, whereby the individual silicon-based domains are either free silicon-based domains that are not or not completely embedded in the matrix or are fully embedded silicon-based domains that are completely surrounded by the matrix material, whereby the percentage of free silicon-based domains is lower than or equal to 4 weight % of the total amount of Si in the composite particles.

Throughout this document the word 'silicon' is used to refer to the element Si in its metallic, zerovalent state and the symbol Si is used to refer to the element Si irrespective of its oxidation state.

For clarification it is noted that both metallic silicon as well as oxidized Si can be present in the composite particles at the same time. The total amount of Si referred to above therefore means the total amount of the element Si, irrespective of its oxidation state.

For completeness it should be noted that in line with usual practice in the field of active materials for positive electrodes, p, x, y, z, m, n, a and (2±b) designate molar amounts.

An electrochemical cell according to the invention combines a high energy density with a good cycle life, better than can be achieved with graphite based negative electrodes and any positive electrode, and better than can be achieved with silicon based negative electrodes in combination with LCO or NMC with a high cobalt content.

With respect to the negative electrode, such composite particles will have a strongly reduced tendency for formation of undesirable SEI compared to traditional composite particles with silicon-based domains, and therefore will have a better cycle performance and will be more apt to be used with high currents.

Without being bound by theory the inventors consider that this is related to a lower possible contact surface between the electrolyte and the silicon-based domains than in traditional composite particles, even though Si is usually not a significant component in SEIs.

With respect to the synergy between such a negative electrode material and such positive electrode material, leading to the superior performance of the electrochemical cell according to the invention, it has been observed that with an active material in the positive electrode that is relatively high in Ni, meaning at least 30 mol % of the non-lithium metal in the active material, but better around 50 mol % and better still around 60 or more mol %, the SEI has a different chemical composition and is thinner, and better able to withstand the inevitable expansion of the silicon during charging and discharging cycles of the electrochemical cell, so that the negative electrode interface is better protected and new SEI is formed slower than would otherwise be the case, and also the loss of lithium is reduced.

The most likely explanations considered by the inventors are that with a high nickel content in the positive electrode the average potential of the positive electrode is lower. The potential reached by the negative electrode, particularly at the end of the discharge, may therefore be different leading to a different SEI behaviour. Additionally, the high nickel content positive electrode materials may absorb protons from water contamination, which could otherwise react with F from the electrolyte to form HF, which will dissolve silicon and also form LiF, thereby consuming lithium from the battery so that it is not available anymore, making the consumption of protons by the high nickel positive electrode material beneficial for the cell.

In a specific embodiment $(x+y+z+m+n+a)=1$

In further specific embodiments $0 \leq a \leq 0.02$ and/or $0 \leq m \leq 0.02$.

In a specific embodiment the matrix material is a thermally decomposed carbon-containing precursor.

In a further specific embodiment the matrix material is carbon and is the thermal decomposition product of pitch.

Free silicon-based domains are defined as those silicon-based domains that are not or not completely shielded by the matrix material and are therefore freely accessible from outside the composite particle.

By a silicon-based domain is meant a cluster of mainly silicon having a discrete boundary with the matrix material. The silicon content in such a silicon-based domain is usually 80 weight % or more, and preferably 90 weight % or more.

In an embodiment the silicon domains are free from elements other than Si and O

In practice, such a silicon-based domain can be either a cluster of mainly silicon atoms in a matrix made from different material or a discrete silicon particle. A plurality of such silicon particles is a silicon powder.

In the latter case the composite particles are then, in other words, composite particles in which a separately produced silicon nano powder is agglomerated with separately produced matrix material. In this case the silicon-based domains are formed by the actual discrete silicon particles from the silicon nano powder.

The silicon-based domains may have a thin surface layer of silicon oxide.

Preferably the silicon-based domains have a weight based size distribution with a $d_{50}$ of 200 nm or less and a $d_{90}$ of 1000 nm or less, and preferably have a weight based size distribution with a $d_{50}$ of 100 nm or less and a $d_{90}$ of 1000 nm or less:

In a particular embodiment the ratio $d_{90}/d_{50}$ is lower than 10, and more preferably lower than 7.

The $d_{50}$ value is defined as the size of a silicon-based domain corresponding to 50 weight % cumulative undersize domain size distribution. In other words, if for example the silicon-based domain size $d_{50}$ is 93 nm, 50% of the total weight of domains in the tested sample are smaller than 93 nm. Analogously $d_{90}$ is the domain size compared to which 90% of the total weight of domains is smaller.

In the case that the silicon-based domains are or were individual loose particles, such size distribution may be simply determined by laser diffraction of these particles. As is well known to the skilled person, particular care has to be taken to de-agglomerate agglomerates in order to reliably determine the particle size.

Aggregates of silicon-based domains may be formed during their synthesis. In the context of this invention, an aggregate is to be understood as a group of domains which are coalesced together in a structure with such an intergrowth degree that said structure can be divided into the individual domains only partially, if at all.

The degree of intergrowth of the aggregates can be influenced by the parameters of the synthesis process of forming said domains which may, for example during their formation, coalesce and grow subsequently together to form the aggregates. Thus a characteristic of an aggregate may be that when attempting to divide it into individual constituent domains, destruction of some or all of the domains will occur.

For simplicity, the definition of domains in accordance with the present invention also includes aggregates of domains which are fused together so that they may not be separated without risk of destruction of the domains.

The domains may also agglomerate due to Van der Waals forces and other electromagnetic forces acting between them to form agglomerates. In contrast to the aggregates, agglomerates are understood in the context of this invention as meaning only a loose association of domains which can readily disintegrate into the constituent domains and are not considered as domains in their own right.

Alternatively, such a size distribution may be determined optically from SEM and/or TEM images by measuring at least 200 silicon-based domains. This method is appropriate if the silicon-based domains are present in a matrix from which they cannot be separated, but may also be used for a silicon based powder. It should be noted that by domain is meant the smallest discrete domain that can be determined optically from SEM or TEM images. The size of a silicon based domain is then determined as the largest measurable line distance between two points on the periphery of the domain.

Such an optical method will give a number-based domain size distribution, which can be readily converted to a weight based size distribution via well-known mathematical equations.

In an embodiment the silicon-based domains are silicon-based particles, meaning that they were, before forming the composite particles, individually identifiable particles that existed separately from the matrix material, since they were not formed together with the matrix, and are preferably free from other elements than Si and O, and the matrix material is carbon, preferably thermally decomposed pitch.

Such an electrochemical cell, in addition to the above-mentioned advantages, additionally has a high first cycle efficiency, in other words a low first cycle irreversibility. This means that the first cycle irreversibility of both electrodes are in a similar range and low. If the first cycle irreversibility of one of the electrodes is much higher than the other, an excess of the active material in this electrode needs to be used which will lead to a lower energy density of the cell In the case of this invention, the first cycle irreversibilities of both electrodes match and are considered as low.

In an embodiment the composite particles also contain graphite, whereby the graphite is not embedded in the matrix material. This ensures that no matrix material needs to be used to embed the graphite which can make up a significant proportion of the composite particles, and that consequently the volumetric silicon loading of the composite particles, and therefore the volumetric energy density of the electrochemical cell, is improved.

In an embodiment x>0.48 and preferably x>0.58, showing the positive effect of a high cycle life to a greater extent. This advantage is analogously present in case z<0.35 and preferably z<0.22

In an embodiment n<0.02.

In a further embodiment n<0.01 and (m+a)<0.02 and z>0.08 and y>0.08.

In a further embodiment x>0.70 and y<0.03 and 0.02≤n≤0.11. Such a material has a high nickel content and also a significant aluminium content, and also gives an excellent electrochemical cell when combined with a negative electrode material as described above.

Preferably, for an increased positive effect, the percentage of free silicon-based domains is lower than 3 weight %, and preferably lower than 2 weight %, and more preferably lower than 1 weight % of the total amount of Si in metallic or oxidised state in the composite powder.

The percentage of free silicon-based domains may be determined by placing a sample of the composite particles in an alkaline solution for a specified time, determining the volume of hydrogen that has evolved after the specified time, calculating the amount of silicon needed for evolving this amount of hydrogen based on a production of two moles of hydrogen for every mole of silicon reacted and dividing this by the total amount of Si in metallic or oxidised state present in the sample.

Such a calculation can simply be done by the skilled person based on the well-known ideal gas law.

The specified time is optimally the time that is needed to fully complete a reaction of nano silicon powder which is not part of a composite with hydroxide ions of the alkaline solution, but not longer. This will of course depend on the temperature chosen and the concentration of the alkaline solution. By choosing these conditions, all free silicon is measured, but fully embedded silicon is not measured because it is shielded by the matrix material. An incorrect measurement of embedded silicon as free silicon might happen if a longer period or more severe conditions are chosen, due to diffusion/penetration of the alkaline solution through the matrix.

In an embodiment the ratio between the average size of the composite powder and the $d_{50}$ of the silicon-based domains is 10 or more, preferably 20 or more and more preferably 40 or more.

Even though the silicon-based domains are usually substantially spherical, they may have any shape, such as whiskers, rods, plates, fibers and needles, etc.

In an embodiment the composite particles contain between 2 weight % and 35 weight % of Si, and in a narrower embodiment the composite particles contain between 8 weight % and 25 weight % of Si.

The characteristics of the embodiments defined above and/or in the claims may be combined to define further embodiments which also fall within the scope of the present invention.

The manufacture and characterisation of an electrochemical cell according to the invention is described in the following examples. Counter examples are also given.

Analytical Methods Used

Determination of Free Silicon

In order to determine the percentage of free silicon-based domains of a negative electrode active material, 0.1 g of the product, having a known total Si content, was placed in a solution of 1.2 g/l KOH in water, at 45° C. A gas burette was used to collect and measure the volume of gas evolved over a 48 hr period, although other gas measurement methods may be envisaged.

A reference test containing only the KOH solution was also performed at same temperature.

The volume of gas evolved in the reference test, presumably due to release of absorbed gasses from air, was subtracted from the volume of gas evolved from the tested product.

The volume of gas thus calculated was converted to a mass of reacted silicon based on the ideal gas law and the knowledge that the reaction of silicon with KOH will proceed according to one or both of the following reactions, which both give an equivalence of 2 moles of hydrogen per mole of silicon:

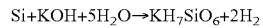

$$Si+KOH+5H_2O \rightarrow KH_7SiO_6+2H_2$$

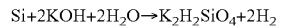

$$Si+2KOH+2H_2O \rightarrow K_2H_2SiO_4+2H_2$$

The percentage of free silicon-based domains was defined as the ratio of the amount of reacted silicon and the total amount of Si in the sample.

It should be noted that in the particular measurement conditions 0.3% free silicon was the detection limit. This detection limit can be reduced by the skilled person by increasing the sample size and/or by reducing the measurement limit of the evolved gas.

Determination of Oxygen Content

The oxygen contents of the products in the examples and the counterexamples were determined by the following method, using a Leco TC600 oxygen-nitrogen analyzer.

A sample of the product to be analyzed was put in a closed tin capsule that was put itself in a nickel basket. The basket was put in a graphite crucible and heated under helium as carrier gas to above 2000° C.

The sample thereby melts and oxygen reacts with the graphite from the crucible to CO or $CO_2$ gas. These gases are guided into an infrared measuring cell. The observed signal is recalculated to an oxygen content.

Determination of the Silicon-Based Domain Size Distribution

Particle size distributions were determined, for the silicon powder used for materials P and Q, defined later, by the following method.

0.5 g of Si powder and 99.50 g of demineralized water were mixed and dispersed by means of an ultrasound probe for 2 min @ 225 W.

The size distributions were determined on a Malvern Mastersizer 2000, using ultrasound during the measurement, using a refractive index for Si of 3.5 and an absorption coefficient of 0.1 and ensuring that the detection threshold was between 5 and 15%.

Determination of Particle Size of Composite Powder for Negative Electrode and Powder for Positive Electrode Particle size distributions for courser powders than in the immediately preceding section were determined by an analogous dry method on the same equipment.

The following measurement conditions were selected: compressed range; active beam length 2.4 mm; measurement range: 300 RF; 0.01 to 900 µm. The sample preparation and measurement were carried out in accordance with the manufacturer's instructions.

Negative Electrode Preparation

A 2.4 wt % Na-CMC solution is prepared and dissolved overnight. Then, TIMCAL Carbon Super P, a conductive carbon is added to this solution and stirred for 20 minutes using a high-shear mixer.

A mixture of graphite and the negative electrode active material is made. The ratio is calculated to obtain a theoretical negative electrode reversible capacity of 500 mAh/g dry material.

Once a good dispersion of the conductive carbon is obtained in the Na-CMC solution, the mixture containing the negative electrode active material is added and the slurry is stirred again using a high-shear mixer during 30 minutes.

The slurry is prepared using 90 wt % of the mixture containing the negative electrode active material, 4 wt % of Na-CMC and 6 wt % of the conductive carbon.

Negative electrodes were then prepared by coating the resulting slurry on a copper foil, at a loading of 6.25 mg dry material/cm$^2$ and then dried at 70° C. for 2 hours. The foil was coated on both sides and calendared.

Positive Electrode Preparation

Positive electrodes are prepared in a similar way as the negative electrode, except using with PVDF dissolved in NMP based binder (PVDF) instead of Na-CMC in water and using a 15 µm thickness aluminium foil current collector instead of copper. The foil was coated on both sides and calendared.

The loading of active materials on the negative electrode and on the positive electrode is calculated to obtain a capacity ratio of 1.1.

Manufacture of Cells for Electrochemical Testing.

Pouch type cells of 650 mAh were prepared, using a positive electrode having a width of 43 mm and a length of 450 mm. An aluminum plate serving as a positive electrode current collector tab was arc-welded to an end portion of the positive electrode.

Negative electrode. A nickel plate serving as a negative electrode current collector tab was arc-welded to an end portion of the negative electrode.

A sheet of the positive electrode, a sheet of the negative electrode, and a sheet of separator made of a 20 µm-thick microporous polymer film (Celgard® 2320) were spirally wound into a spirally-wound electrode assembly. The wound electrode assembly and the electrolyte were then put in an aluminum laminated pouch in an air-dry room, so that a flat pouch-type lithium battery was prepared having a design capacity of 650 mAh when charged to 4.20 V.

LiPF6 1 M in a mixture of 10% fluoro-ethyl carbonate and 2% vinylene carbonate in a 50/50 mixture of ethylene carbonate and Diethyl carbonate was used as electrolyte.

The electrolyte solution was allowed to impregnate for 8 hrs at room temperature. The battery was pre-charged at 15% of its theoretical capacity and aged 1 day, at room temperature. The battery was then degassed and the aluminum pouch was sealed.

The battery was prepared for use as follows: under pressure, the battery was charged using a current of 0.2 C (with 1 C=650 mA) in CC mode (constant current) up to 4.2V then CV mode (constant voltage) until a cut-off current of C/20 was reached, before being discharged in CC mode at 0.5 C rate down to a cut-off voltage of 2.7V Determination of Electrochemical Performance The lithium full cell batteries are charged and discharged several times under the following conditions, at 25° C., to determine their charge-discharge cycle performance:

Charge is performed in CC mode under 1 C rate up to 4.2V, then CV mode until C/20 is reached, The cell is then set to rest for 10 min, Discharge is done in CC mode at 1 C rate down to 2.7V, The cell is then set to rest for 10 min, The charge-discharge cycles proceed until the battery reaches 80% retained capacity. Every 25 cycles, the discharge is done at 0.2 C rate in CC mode down to 2.7 V.

The retained capacity at the n$^{th}$ cycle is calculated as the ratio of the discharge capacity obtained at cycle n to cycle 1.

The number of cycles until the battery reaches 80% retained capacity is reported as the cycle life.

Manufacture of Positive Electrode Active Material

Five positive electrode active materials were used.

The materials further designated A, B and C were prepared as follows:

Mixed hydroxide precursors were prepared through a co-precipitation process. A mixed Ni—Co—Mn sulphate with a total metal concentration of 2 M is fed continuously into a continuous stirring tank reactor (CSTR). In addition to the metal sulphate solution, a 10 M NaOH solution and a 10 M ammonia solution were simultaneously fed into the CSTR. The temperature of the reactor was maintained at 60° C., by a heating jacket. The flow rates of these solutions were controlled by mass flow meters to give a residence time of 6 hours, with almost no excess of NaOH solution and an ammonia concentration of 10-15 g/L. Under such precipitation conditions, a pH range of 10.5-11.5 was established.

The mixed hydroxide precursors were collected from an overflow of the CSTR. The obtained precursor slurry was filtered and washed with deionized water. After drying in air at 150° C. for 24 hours, dry mixed hydroxide precursors were obtained.

Relative molar metal concentrations as specified in table 1 were used in the various mixed Ni—Co—Mn sulphate solutions:

TABLE 1

| Hydroxide for material: | Relative molar Ni concentration | Relative molar Mn concentration | Relative molar Co concentration |
|---|---|---|---|
| A | 80 | 10 | 10 |
| B | 60 | 20 | 20 |
| C | 34 | 33 | 33 |

After this, the mixed hydroxide precursors were mixed with technical grade Li$_2$CO$_3$ so that the Li/(Ni+Mn+Co) molar ratio=1.02. The mixtures were then heated at 950° C. in an air atmosphere for 20 hrs. After heating, the obtained products were pulverized and sieved to obtain products A, B and C having a d50 particle size of circa 10 µm.

Product D was prepared analogously, except for the following features a mixed Ni—Co—Al solution was used with a molar ratio Ni:Co:Al=80:15:5;

a pH range of 10.0-11.0 was established in the CSTR;

drying of the mixed hydroxide took place at 100° C. in an inert atmosphere

LiOH was used as lithium source instead of $Li_2CO_3$ heat treatment was at 750° C. in pure oxygen.

Lithium mixed metal oxide powders were thus obtained, designated as materials A, B, C and D.

The relative Ni, Mn, Co, Al ratios were measured and confirmed to be the same as those in the mixed metal sulphate solutions. The Li/(Ni+Mn+Co+Al) ratio was measured and confirmed to be between 0.99 and 1.01 for all materials. The slight difference between the Li/(Ni+Mn+Co+Al) ratio during manufacture and in the final product is due to some loss of Li during the heat treatment step.

The fifth positive electrode active material, further designated material E was $LiCoO_2$ powder, commercially available from Umicore under the name XD20, having d50=15 μm, d90=30 μm.

Manufacture of Negative Electrode Active Materials

Three negative electrode active materials were used, designated materials P, Q, and R.

Material P was prepared as follows:

A nano silicon powder was first prepared as follows:

A micron-sized silicon powder was provided as precursor. A 60 kW radio frequency (RF) inductively coupled plasma (ICP) was applied, using an argon plasma. The precursor was injected in the plasma at a rate of 220 g/h, resulting in a prevalent (i.e. in the reaction zone) temperature above 2000K.

In this first process step the precursor became totally vaporized followed by a nucleation into nano silicon powder. An argon flow was used as quench gas immediately downstream of the reaction zone in order to lower the temperature of the gas below 1600K. In this way the metal nuclei were formed. Finally, a passivation step was performed at a temperature of 100° C. during 5 minutes by adding 100 l/h of a $N_2/O_2$ mixture containing 0.15 mole % oxygen.

The argon gas flow rate for both the plasma and for the quench gas was adjusted to obtain nano silicon powder having particles with a $d_{50}$ of 80 nm and a $d_{90}$ of 521 nm. In the present case 2.5 $Nm^3$/h Ar was used for the plasma and 10 $Nm^3$/h Ar was used as quench gas.

A blend was then made of 11.5 g of the mentioned nano silicon powder and 24 g petroleum based pitch powder. This was heated to 450° C. under $N_2$, so that the pitch melted, and, after a waiting period of 60 minutes, mixed for 30 minutes by means of a dispersion disk.

The suspension of nano silicon in pitch thus obtained was cooled under $N_2$ to room temperature and milled.

8 g of the milled mixture was mixed with 7.1 g graphite for 3 hrs on a roller bench, after which the obtained mixture was passed through a mill to de-agglomerate it. At these conditions good mixing is obtained but the graphite doesn't become embedded in the pitch.

A thermal after treatment was given to the powder as follows: the powder was put in a quartz crucible in a tube furnace, heated up at a heating rate of 3° C./min to 1000° C. and kept at such temperature for two hours and then cooled. All this was performed under argon atmosphere.

The fired product was pulverized to form a composite powder and sieved on a 400 mesh sieve. The resulting material is designated material P Material Q was prepared as follows:

The same nano silicon powder as used for material P was used. A blend was made of 2.58 g of this nano silicon powder and 5.42 g pitch and 7.1 g graphite, and was mixed for 3 hrs on a roller bench, after which the obtained mixture was passed through a mill to de-agglomerate it.

The previous steps were performed at room temperature so that the pitch did not melt.

A thermal after treatment, pulverisation and sieving were performed as for material P.

The total Si content of materials P and Q was measured as 20%+/−0.5% by chemical analysis. Material P had a d50 of 14 μm and a d90 of 27 μm. Material Q had a d50 of 17 μm and a d90 of 35 μm.

Material R was prepared as follows:

At room temperature, 7.44 ml TEOS (tetraethylorthosilicate), used as Si source, was dissolved in 125 ml water, wherein 1 g polyvinylpyrrolidone (PVP) was added. The PVP plays two roles in the synthesis of nano-sized SiOx. The first role is to help the dissolution of TEOS into water. Because TEOS cannot be directly dissolved in water and PVP is an amphipathic molecule with organic groups and inorganic groups, it can bring TEOS into water and promote the hydrolysis of TEOS into Si(OH)x particles. The second role is to prevent the agglomeration of nano-sized SiOx by hydrogen-bonding the silanol groups (Si—OH).

The solution was transferred to a 200 ml autoclave and hydrothermally treated at 130° C. for 1 h. After cooling down to room temperature, the product inside the autoclave was transferred into a flask, and then a sucrose solution of 3.287 g sucrose in 15 ml water was introduced into it under stirring. The mixed solution was dried at 90° C. in a rotary evaporator under reflux condition.

The obtained viscous slurry was coked at 250° C. for 10 h in an oven and then calcined at 800° C. for 1 h in 5% $H_2$/Ar atmosphere to produce $SiO_x$/C composite powders.

The powder consisted of many near-spherical particles with a size ca. 1 μm and a certain amount of aggregated large particles, The oxygen content in the obtained $SiO_x$/C composite powder was 17 wt %. The silicon content was 37 wt % and the carbon content was 45 wt %. From this it can be calculated that the $SiO_x$ had an x-value of circa 0.8.

The free silicon content, oxygen content and electrochemical performance of materials P, Q and R and were measured as explained above. The results are reported in table 2.

TABLE 2

| Material | Free silicon (%) | Oxygen (%) |
| --- | --- | --- |
| P | <0.3 | 0.5 |
| Q | 4.2 | 0.9 |
| R | 6 | 28 |

Cells were prepared as explained above with combinations of negative and positive active materials according to table 3, and the electrochemical performance was tested as explained above.

TABLE 3

| Battery number | Positive electrode active material | Negative electrode active material | Cycle life 1 C | Cycle life C/5 | First cycle irreversibility |
| --- | --- | --- | --- | --- | --- |
| 1 | A | P | 257 | 290 | 19% |
| 2 | B | P | 207 | 240 | 17% |
| 3 | C | P | 180 | 180 | 16% |
| 4 | D | P | 260 | 285 | 16.5% |
| 5 | E | P | 140 | 160 | 18% |

TABLE 3-continued

| Battery number | Positive electrode active material | Negative electrode active material | Cycle life 1 C | Cycle life C/5 | First cycle irreversibility |
|---|---|---|---|---|---|
| 6 | E | Q | 70 | 100 | 20% |
| 7 | B | Q | 72 | 95 | 20% |
| 8 | D | Q | 75 | 105 | 19% |
| 9 | E | R | 169 | 180 | 28% |
| 10 | D | R | 250 | 275 | 27% |

It can be seen that only a combination of negative electrode active material having a low free silicon content with positive electrode active material having a medium to high Ni content and/or or a medium to low cobalt content allows to obtain a battery with both a good cycle life as well as a low first cycle irreversibility.

The invention claimed is:

1. Rechargeable electrochemical cell comprising a negative electrode and a positive electrode,
wherein the positive electrode comprises a mixed metal oxide product having as overall formula $Li_p(Ni_xMn_yCo_zM_mAl_nA_a)O_{2\pm b}$,
wherein M signifies one or more elements from the group Mg, Ti, Cr, V and Fe,
wherein A signifies one or more elements from the group F, C, Cl, S, Zr, Ba, Y, Ca, B, Sn, Sb, Na and Zn,
wherein $0.9<(x+y+z+m+n+a)<1.1$,
wherein $b<0.02$
wherein $0.9<p<1.1$
wherein $0.48<x<0.95$
wherein $(y+z)\geq 0.09$
wherein $0\leq m\leq 0.05$
wherein $0\leq a\leq 0.05$,
wherein $0\leq n\leq 0.15$,
and wherein the process for preparing the mixed metal oxide product results in molar amount values x, y, z, m, n, and a being consistent throughout the product,
wherein the negative electrode comprises composite particles, wherein the composite particles comprise silicon-based domains in a carbon matrix material and graphite, wherein the graphite is not embedded in the carbon matrix material, wherein the composite particles contain between 2 wt % and 35 wt % Si and the silicon-based domains have a weight based size distribution with ads) ranging from 80 nm to 200 nm, and wherein the individual silicon-based domains are either free silicon-based domains that are not or not completely embedded in the carbon matrix or are fully embedded silicon-based domains that are completely surrounded by the carbon matrix material, wherein the percentage of free silicon-based domains is lower than or equal to 4 weight % of the total amount of Si in metallic or oxidized state in the composite particles.

2. Electrochemical cell according to claim 1, wherein the carbon matrix material is the thermal decomposition product of one or more of the products selected from the group consisting of: polyvinyl acrylate, polyvinyl chloride, polyvinylidene fluoride, polyacrylic acid, and pitch.

3. Electrochemical cell according to claim 1, wherein the silicon-based domains have a weight based size distribution with a $d_{90}$ of 1000 nm or less.

4. Electrochemical cell according to claim 1, wherein the composite particles contain less than 3 weight % of oxygen.

5. Electrochemical cell according to claim 1, wherein the silicon-based domains are silicon-based particles.

6. Electrochemical cell according to claim 1, wherein the silicon-based domains contain less than 1 weight % of elements other than Si and O.

7. Electrochemical cell according to claim 1, wherein the composite particles have an average particle diameter $d_{50}$ of between 1 and 20 microns.

8. Electrochemical cell according to claim 1, wherein $z<0.35$.

9. Electrochemical cell according to claim 1, wherein $n<0.05$.

10. Electrochemical cell according to claim 1, wherein $x>0.70$ and $y<0.03$ and $0.02\leq n\leq 0.11$.

11. Electrochemical cell according to claim 1, wherein $n<0.01$ and $(m+a)<0.02$ and $z>0.08$.

12. A rechargeable battery comprising at least one electrochemical cell according to claim 1.

* * * * *

UNITED STATES PATENT AND TRADEMARK OFFICE
CERTIFICATE OF CORRECTION

| | | |
|---|---|---|
| PATENT NO. | : 11,502,285 B2 | |
| APPLICATION NO. | : 16/332421 | |
| DATED | : November 15, 2022 | |
| INVENTOR(S) | : Jean-Sébastien Bridel et al. | |

It is certified that error appears in the above-identified patent and that said Letters Patent is hereby corrected as shown below:

On the Title Page

Item (72): Line 3 of "Inventors", "Daniel Nelis" should be replaced with --Daniël Nelis--.

Signed and Sealed this
Third Day of January, 2023

Katherine Kelly Vidal
*Director of the United States Patent and Trademark Office*